US008412354B2

(12) United States Patent
Deixler et al.

(10) Patent No.: US 8,412,354 B2

(45) **Date of Patent: *Apr. 2, 2013**

(54) CONTROLLABLE LIGHT SOURCE HAVING A PLURALITY OF LIGHT ELEMENTS

(75) Inventors: Peter Deixler, Eindhoven (NL); Cornelis Jojakim Jalink, Eindhoven (NL); Paul Stravers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 462 days.

This patent is subject to a terminal disclaimer.

(21) Appl. No.: 12/517,367

(22) PCT Filed: Dec. 7, 2007

(86) PCT No.: PCT/IB2007/054964

§ 371 (c)(1), (2), (4) Date: Jun. 3, 2009

(87) PCT Pub. No.: WO2008/068728

PCT Pub. Date: Jun. 12, 2008

(65) Prior Publication Data

US 2010/0079091 A1 Apr. 1, 2010

(30) Foreign Application Priority Data

Dec. 8, 2006 (EP) .................................... 06125693

(51) Int. Cl.
*G05B 11/01* (2006.01)

(52) U.S. Cl. ............. 700/20; 700/11; 315/312; 315/320

(58) Field of Classification Search .................... 700/11, 700/20, 22, 286; 315/312, 320

See application file for complete search history.

(56) References Cited

U.S. PATENT DOCUMENTS

| | | | | |
|---|---|---|---|---|
| 5,544,037 | A | 8/1996 | Luger | |
| 6,016,038 | A | 1/2000 | Mueller et al. | |
| 6,498,440 | B2 | 12/2002 | Stam et al. | |
| 6,788,011 | B2 | 9/2004 | Mueller et al. | |
| 6,912,429 | B1 * | 6/2005 | Bilger | 700/19 |
| 6,965,205 | B2 | 11/2005 | Piepgras et al. | |
| 7,023,147 | B2 | 4/2006 | Colby et al. | |
| 2002/0113555 | A1 * | 8/2002 | Lys et al. | 315/149 |
| 2003/0214259 | A9 | 11/2003 | Dowling et al. | |
| 2004/0232856 | A1 | 11/2004 | Huber | |
| 2006/0082331 | A1 * | 4/2006 | Ashdown | 315/291 |
| 2007/0045524 | A1 * | 3/2007 | Rains et al. | 250/228 |

FOREIGN PATENT DOCUMENTS

| | | | |
|---|---|---|---|
| EP | 1445989 | A1 | 8/2004 |
| EP | 1659832 | A1 | 5/2006 |
| WO | 0169979 | A1 | 9/2001 |
| WO | 2006030191 | A1 | 3/2006 |

* cited by examiner

*Primary Examiner* — Mohammad Ali
*Assistant Examiner* — Nathan Laughlin
(74) *Attorney, Agent, or Firm* — John F. Salazar; Mark L. Beloborodov

(57) ABSTRACT

A light source having a plurality of light elements and a control system for controlling the light elements. The control system comprises a plurality of light element controllers, each connected to a respective light element, and arranged to obtain light element data; and a bus interface, which is connected to the light element controllers via a light source bus. The bus interface provides the light element controllers with a general command, and the light element controllers generate light element drive signals on basis of the general command and the light element data.

14 Claims, 7 Drawing Sheets

CONTROLLABLE LIGHT SOURCE HAVING A PLURALITY OF LIGHT ELEMENTS

FIELD OF THE INVENTION

The present invention relates to a light source, which has a plurality of light elements and a control system for controlling said plurality of light elements.

BACKGROUND OF THE INVENTION

A conventional light source is schematically shown in FIG. 1. It has a plurality of light elements, such as RGB elements, 107; that is, an element that generates red light, an element that generates green light, and an element that generates blue light. When combined the light elements 107 are able to provide any desired color of the emitted light. In order to obtain a desired color, or character, typically defined as color point, of the emitted light a control system is included in the light source 101.

A main part of the control system is a light source controller 103, which calculates individual drive signals for all of the light elements 107 and feeds the individual drive signals to the individual light elements 107, and more particularly to drivers 105 thereof. This is done via a light source bus 109, where the light source controller 103 consecutively addresses the light elements 107. The power consumption of the controller is relatively high, since it is comparable to a (simple) computer that is permanently switched on.

SUMMARY OF THE INVENTION

It is an object of the present invention to provide a light source wherein the control system has a reduced power consumption.

This object is achieved by a light source according to the present invention as defined in claim 1.

The invention is based on an insight that a distributed network of controllers is power saving in relation to a centralized structure.

Thus, in accordance with an aspect of the present invention, there is provided a light source, which has a plurality of light elements and a control system for controlling said plurality of light elements. The control system comprises:

- a plurality of light element controllers, each connected to a respective one of said light elements, and arranged to obtain light element data; and
- a bus interface, which is connected to said light element controllers via a light source bus, wherein said bus interface is arranged to provide said light element controllers with a general command, and wherein said light element controllers are arranged to generate light element drive signals on basis of the general command and said light element data.

By decentralizing the computing capability the structure of the bus interface is reduced to a most simple one which does not need to do the calculations of individual drive signals for each light element. Consequently, the frequency requirements can be considerably reduced. Further, each individual light element controller only need to perform calculations for a single light element, which also is a considerable relief compared to the central controller of the prior art. This typically also means that the supply voltage of the controllers can be lowered. In spite of the multiplied number of controllers, the mentioned changes from prior art result in a reduction of the total power consumption. It should be noted that by "light element" is understood a single light emitter, which is the typical situation, as well as a group of light emitters, which are driven simultaneously, i.e. by the same drive signal.

Furthermore, the amount of data transmitted on the light source bus is radically decreased.

In accordance with an embodiment of the light source, as defined in the claims, the light source bus is set in broadcast mode. An advantage of this embodiment is that the general command is simply broadcasted to all light elements in one operation. For example, this can be compared with the prior art individual addressing, where the commanding frequency had to be N times as high in order to transmit a command to all N light elements within the light source. Furthermore, in the prior art light source, the light source bus transfers both address and complex data information, while according to this embodiment, the light source bus transfers only simple data information.

In accordance with an embodiment of the light source, as defined in the claims, the controllers can be individually switched off. For example, this can be done whenever one or more colors are not being used. This reduces the power consumption even more.

In accordance with an embodiment of the light source, as defined in the claims, overall light settings are sent from the bus interface to the light element controllers. This is a typical and advantageous use of the distributed controller structure according to this invention. For instance, the light settings can be color points, saturation, hue, and/or brightness.

In accordance with an embodiment of the light source, as defined in the claims, each light element controller has a light element storage. The light element data can be prestored or/and received from an external source during operation of the light source.

In accordance with an embodiment of the light source, as defined in the claims, symbol tags are used as simple means for obtaining some degree of selection when sending the general commands. However, depending on what type of symbol tag is included in the command, anything from none to all of the light elements can be selected.

In accordance with an embodiment of the light source, as defined in the claims, each light element controller is able to redefine an associated symbol tag if an internal state of the light element changes.

Further, in accordance with the present invention, there is provided a luminaire, including a number of light sources, as defined in the claims. A luminaire controller, comprised in the luminaire, communicates the general command to the bus interfaces of the light sources.

In accordance with an embodiment of the luminaire, as defined in the claims, the luminaire controller comprises an effect translator, which is arranged to receive experience data and translate it into at least one effect, which in turn is realised as a series of one or more general commands. Experience data relates to an experience that a user of the luminaire is supposed to experience as a result of the output from the light sources, such as soft evening light, night darkness, bright working light, etc. An effect is related to a setting of the light sources, such as dimming, flashing, emitting a particular color, etc.

In accordance with an embodiment of the luminaire, as defined in the claims, the luminaire controller as well has a symbol tag interpreter acting in a similar way as the symbol tag interpreter in the bus interface of the light sources.

Further, in accordance with the present invention, there is provided a luminaire system, as defined in the claims. The luminaire system comprises several luminaries and a system controller, which is connected to the luminaries. The system controller sends output data regarding the mentioned experience to the luminaire controllers.

According to an embodiment of the luminaire system, as defined in the claims, the output data is individual experience commands, which are addressed to selected individual luminaries. Addressing on this level is not very power consuming, and is advantageous when there are luminaries which should be differently set. However, on the other hand, in another embodiment, as defined in claim 16, the output data is broadcasted to the luminaries, which is an efficient way to send the same command to several luminaries at the same time.

In accordance with an embodiment of the luminaire system, as defined in the claims, the system controller is provided with a symbol tag generator, which generates the symbol tags that are handled in the system as mentioned above.

In general, the invention features a controller for a lighting system. Command receiving circuitry is designed to receive lighting command messages. A format of the messages includes a tag value and an instruction value. The tag value specifies a physical attribute of the lighting device to which the message is directed. The instruction value specifies an action to be taken by the lighting device to which the message is directed. The command receiving circuitry has tag comparison circuitry designed to detect messages whose tag value corresponds to the lighting device. Lighting device controlling circuitry is designed to accept the instruction value of a message with a detected corresponding tag value and in response, to output an instruction value for controlling lighting elements of the lighting device.

In general, in a second aspect, the invention features a controller for a lighting system. Command receiving circuitry is designed to receive lighting command messages. A format of the messages includes an instruction value specifying a human emotional experience to be induced by the lighting device to which the message is directed. Lighting device control circuitry is designed to accept the instruction value of a message with a detected corresponding tag value and in response, to translate the emotional experience into specific level values for controlling lighting elements of the lighting device.

Embodiments of the invention may include one or more of the following features. There may be a plurality of light element controllers, each connected to a respective one of said light elements. At least some of the light element controllers may include a light element data storage containing stored calibration data for the light element. The messages may be issued in broadcast mode. Storage circuitry may be designed to store calibration data relating to the lighting elements, and the light element controlling circuitry may be further designed to generate the lighting element drive signals based on the calibration data. The attribute designated by the tag may be a location of the lighting device, or a capability of the lighting device. The light device may be tagged with several different types of tags. The light elements may be solid state light sources, or LED's. The light element controllers may be individually switchable between on and off states. The instruction may include color settings. The light element controllers may include state monitors that is able to redefine said at least one symbol tag if an internal state of the light element changes. The controller may, in addition to the tag designation, have an address, and commands may be issued to the controller by command. The controller may be a luminaire controller, a room controller or a building controller.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
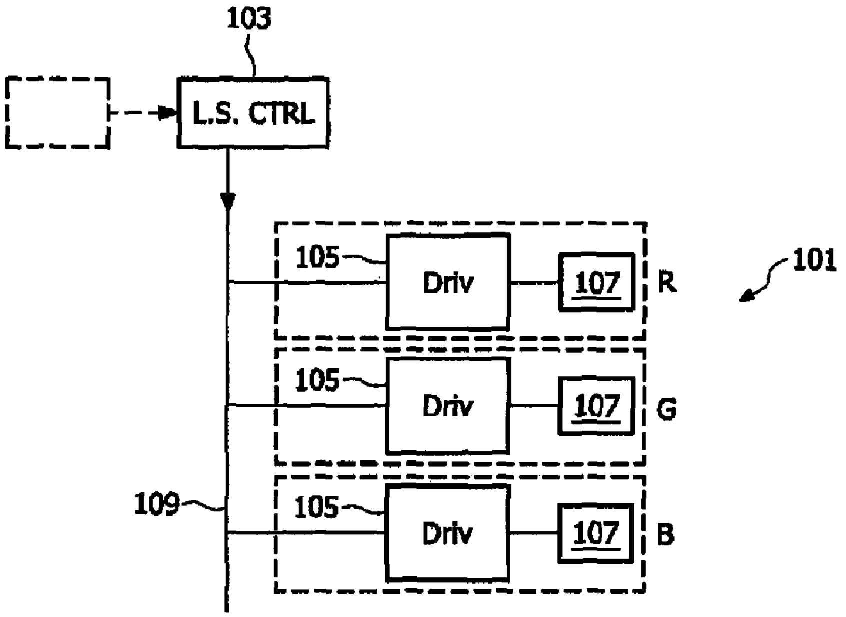
FIG. 1 PRIOR ART
FIG. 1 is a schematic diagram of a prior art light source.
Figure 2:
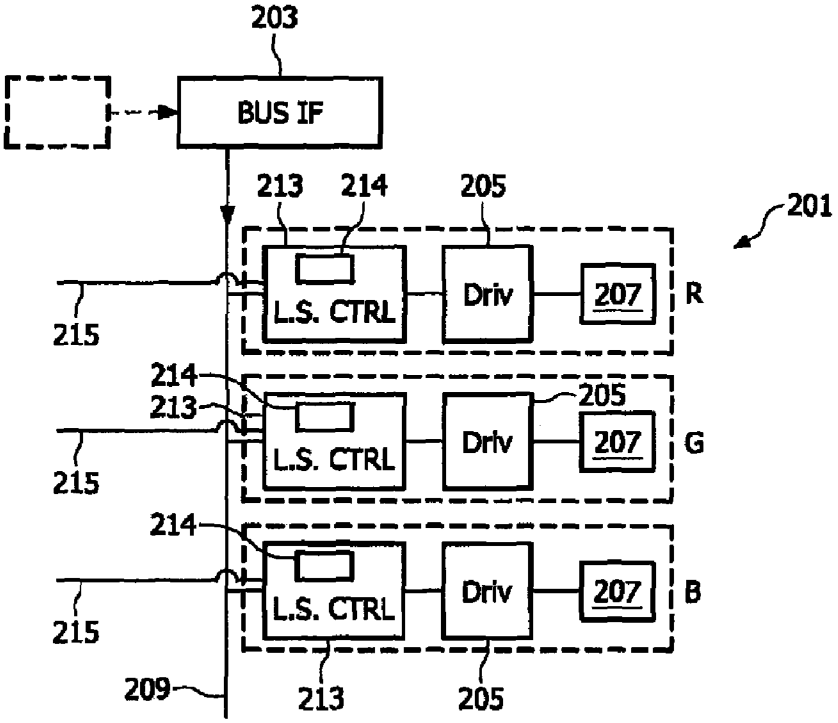
FIG. 2 is a block diagram of an embodiment of a light source according to the present invention.

Referring to FIG. 2 an embodiment of a light source 201 comprises a bus interface (BUS IF) 203, which is connected via a light source bus 209 to several light element controllers 213. The controllers are used for causing the light source 201 to emit light of a desired character, for example as regards color and intensity. The light source bus is set in a broadcasting mode, which means that an output from the bus interface 203 is sent to all light element controllers 213 at the same time.

Each light element controller 213 is connected to a driver 205 of a light element 207. In the illustrated embodiment there are several light elements 207 of each one of three different colors, namely red (R), green (G) and blue (B), and one light element 207 of each color is shown in FIG. 2. For example, the light elements 207 are LEDs, but any solid state light (SSL) element is incorporated within the scope of this invention. Additionally, the invention is applicable to conventional light sources (TL, HID, etc.) and hybrids having controllable light elements. Each light element controller 213 has a storage 214, in which light element data, such as peak wavelength, flux and temperature behaviour, for the light element 207 is stored. The light element data has been prestored in the storage 214, and originates from LED binning and LED-make data. Additionally, it is possible to update the stored light element data by means of an external data input 215, and the storage can be empty from the beginning and loaded with the light element data when first needed. As an alternative embodiment, the light element controller 213, instead of obtaining the light element data from the storage 214, obtains the light element data directly from another source, either externally of the light source or internally thereof.

An advantage of the light source 201 according to this invention is that, since the control function is distributed and the light source bus 209 operates in a broadcasting mode, the light source is easily scalable. In other words, it is easy to add light elements without having to reprogram any bus interface 203, and so forth. As will be evident from below, the scalability is even more emphasized on a higher level, such as a luminaire having several light sources or a light system having several luminaires. Thereby, the light system is advantageously modular.

The light source control operates as follows. The bus interface 203 broadcasts a general command, typically including overall light settings for the light elements 207, to the light element controllers 213. Each light element controller 213 has a capability of calculating specific drive signal data for the light element 207 to which it is connected. Thus, on basis of the general command that the light elements receive over the light element bus 209 and the light element data, which is read from the storage 214, each light element controller 213 then determines individual drive signals for the specific light element to which it is connected, and applies the drive signals to the light element driver 205. The light element driver 205 then sets the drive current to the light element 207 accordingly. More specifically, preferably matrix calculation, as known to the skilled person, is applied for converting the light settings into modulated drive currents, which are fed to the light elements 207. The method of driving the light elements 207, i.e. modulating their drive currents, can be any known or future method, such as PWM, i.e. Pulse Width Modulation, AM, FM, PCM, etc., of the drive currents.

Since the bus interface 203 is "dumb", i.e. it needs no computational capacity for performing calculations, the structure thereof can be made fairly simple. Further it is only used for broadcasting commands, which means that it neither needs any addressing capability. The controller "intelligence" has been moved into each individual light element controller 213. However since each light element controller 213 only needs to serve a single light element, to which it is directly connected, the performance demands on it are significantly decreased compared to those of the prior art light source controller 103. As regards the bus interface 203, for example, it manages with a lower voltage level than the prior art light source controller 103, such as 1.5V supply voltage instead of 2.5V. The light element controllers 213 can be supplied with 1.5V as well. It should be noted that this is a mere not limiting example of a practical implementation. Furthermore, considerably lower bus speeds, or clock frequencies, are necessary than in the prior art light source, and the bus width, in bits, can be reduced, which also reduces the power consumption and complexity of the structure.

Figure 3:
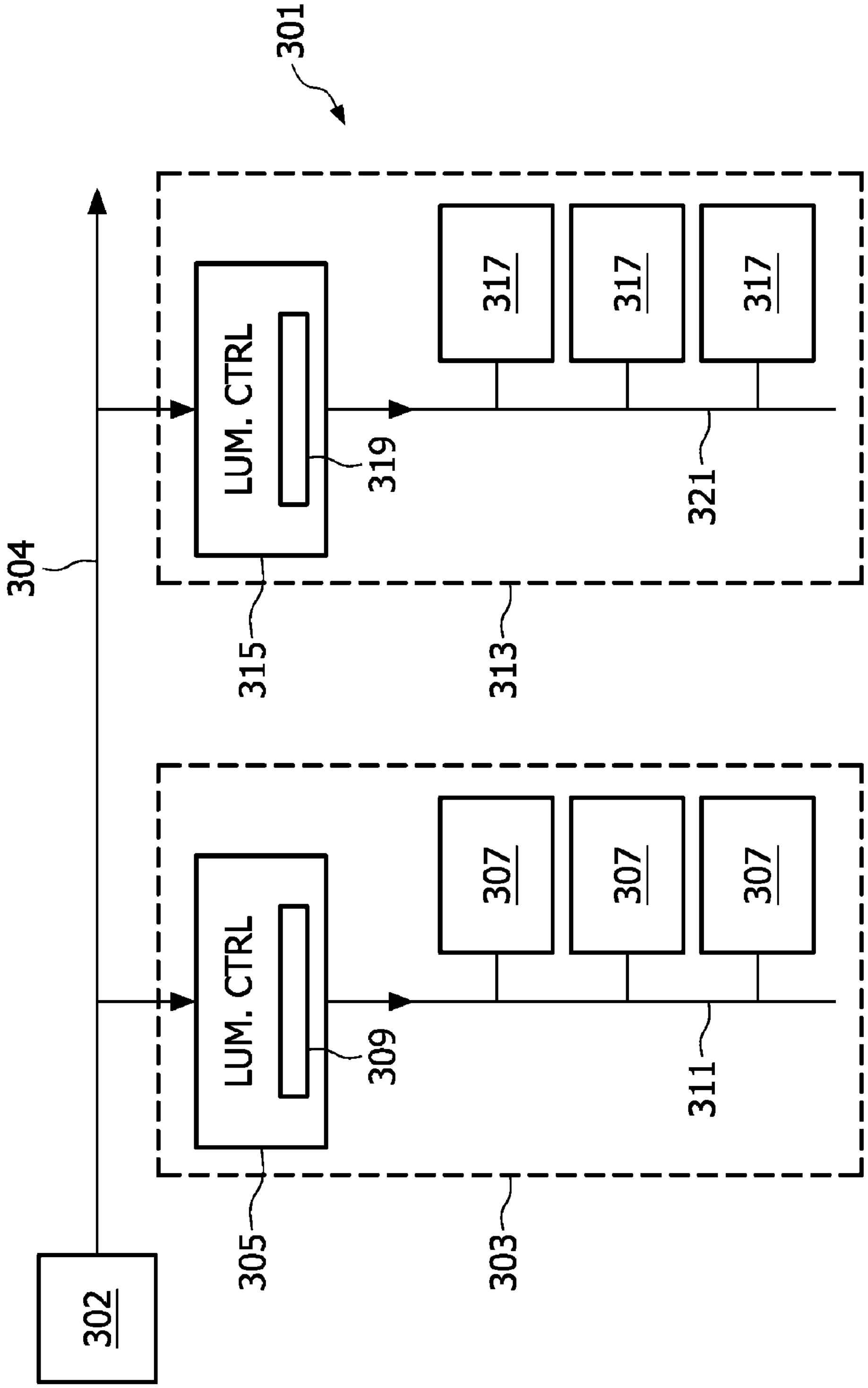
FIG. 3 is a block diagram of an embodiment of a luminaire system according to the present invention.
Figure 4:
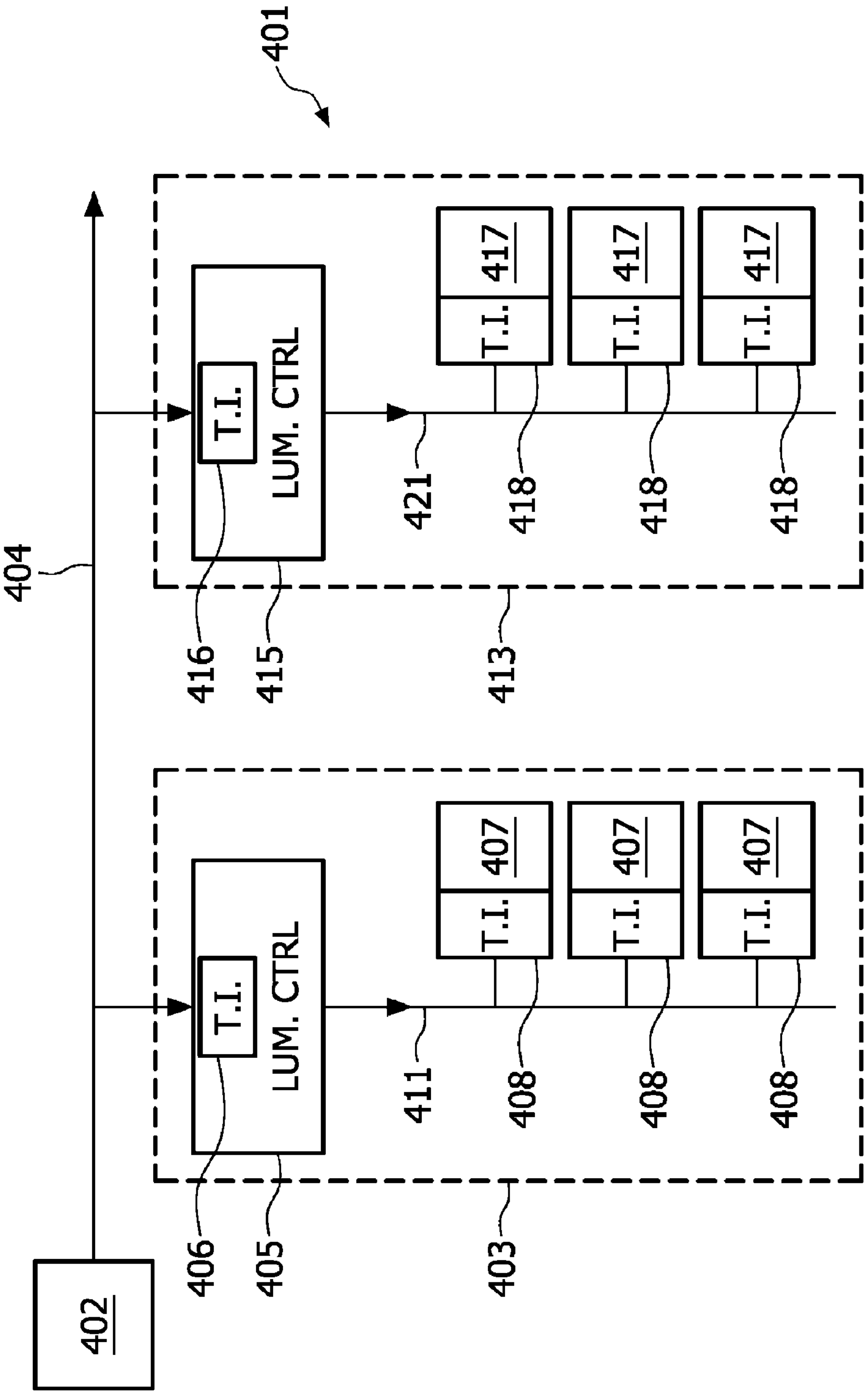
FIG. 4 is a block diagram of another embodiment of a luminaire system.

A full lighting system consists of many light sources and can be regarded as structured in several levels. Consider the light source as a specific level. Then at a higher level, there is a luminaire comprising a plurality of light sources and at a still higher level, there is a luminaire system comprising a plurality of luminaries, as shown in FIGS. 3 and 4. This luminarie system level is typically a room level, or even a building level.

Thus, in one embodiment of a luminaire system, FIG. 3, the luminaire system 301 comprises a room controller, or building controller, 302, which is connected via a system bus 304 to several luminaries 303, 313. More particularly the room controller 302 is connected to a luminaire controller 305, 315 of each luminaire 303, 313. Each luminaire controller 305, 315, in turn, is connected via a luminaire bus 311, 321 to the bus interfaces of a plurality of light sources 307, 317. The light sources 307, 317 have the same construction as described above. The luminaire controllers 305, 315 are arranged to broadcast general commands to the light sources 307, 317, which handle the general commands in the way that has been described above. Each luminaire 305, 315, in turn, receives input data from the room controller 302. The input data is in a high abstraction form called experience data, or experience commands. Examples of experiences have been given above in conjunction with the summary of the invention, and some more are "cold water", "romantic", "party", etc. For instance, the known amBX (ambient experience) protocol from Philips, as described in amBIENT magazine, issued by Philips, is useable for describing the experience. At a top level, the room controller 302 has a user interface, by means of which a user of the luminaire system selects experiences as desired from a list of available experiences. Alternatively, or in addition the room controller 302 is programmable in that the user has a possibility to define personal experiences. Optionally, the user interface has a wireless input as well. Upon receiving input from the room controller 302 each luminaire controller 305, 315 translates the experience command into an effect by means of the effect translator 309, 319. For this function the luminaire controller 305, 315 keeps pre-stored translation data in its memory. As a result the luminaire controller 309, 319 sends one general command or a series of general commands to the light sources 307, 317. This means that the effect is realised as overall light settings, and in order to execute the effect several different light settings separated in time may be needed. For example, an experience may require a repetitive shifting between different colors, which goes on until another experience is commanded by the room controller 302.

In an alternative embodiment of the luminaire system 301 the system bus is set in addressing mode instead of broadcasting mode. That is, the room controller 302 employs individual luminaire addresses for sending experience commands to one or more selected luminaries 305, 315.

Figure 5:
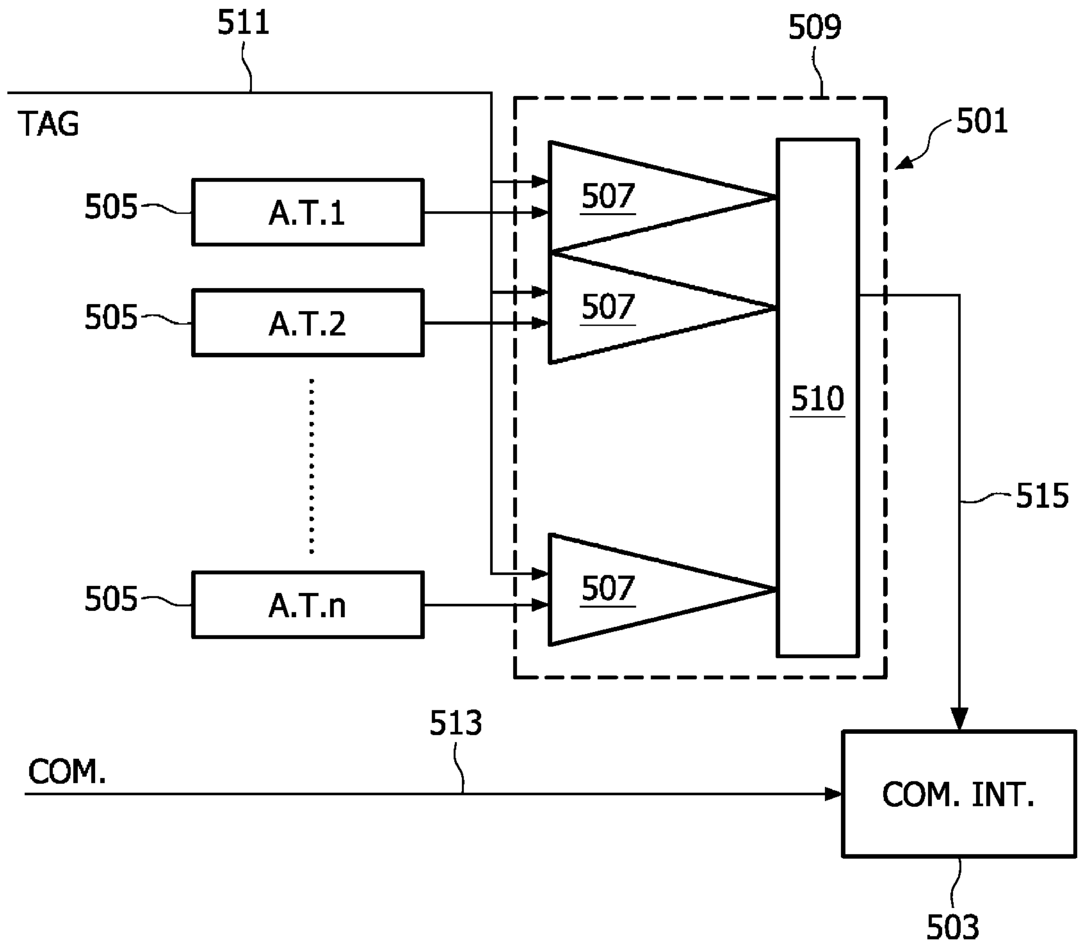
FIG. 5 is a block diagram of a part of a luminaire in the luminaire system of FIG. 4.

Furthermore the invention includes the use of tags as will be explained in the following, under reference to FIGS. 4 and 5. In a luminaire system 401 employing symbol tags, the room controller 402 sends experience commands which are tagged with a symbol tag, or with a plurality of symbol tags. A symbol tag acts as a qualifier of the command. Multiple symbol tags can be attached to a single command. Additionally, multiple luminaire controllers 405, 415, which are connected to the system bus 404, may respond to the same symbol tag. Possible alternatives are also the use of a special symbol tag causing all luminaire controllers 405, 415 to respond, and the use of a special symbol tag that causes none of the controllers 405, 415 to respond. The latter would be useful for diagnostic purposes. Each luminaire controller 405, 415 has a symbol tag interpreter 406, 416, which is capable of interpreting the symbol tags and checking if the luminaire 405, 415 has a corresponding active symbol tag. If the answer is affirmative, the experience command is accepted and handled. When the luminaire 405, 415, as a result of the experience command, sends one or more general commands to the light sources 407, 417 of the luminaire 403, 413 over the luminaire bus 411, 421, the general commands as well includes a symbol tag. The bus interface of each light source 407, 417 includes a tag interpreter 408, 418, which interprets the symbol tag attached to each general command in a similar way as the tag interpreter of the luminaire controller 405, 415.

An embodiment of the tag interpreter 501 comprises a plurality of active symbol tags 505 A.T.1, A.T.2, . . . A.T.n, which are stored in the luminaire controller storage. The symbol tag of an incoming command is received at the tag interpreter 501 on a tag bus 511, and fed to a number of comparison elements 507, one for each storage position holding, or being empty but reserved for, a symbol tag, which may be active or inactive. The comparison elements 507 each output a logical one or zero to an OR-gate 510, which is comprised in a comparator unit 509 in conjunction with the comparison elements 507. If any match between the received symbol tag and the stored active symbol tag or tags 505 occurs, the OR-gate 510 outputs a logical one, via an enablement connection 515, to a command interpreter 503, which is thereby enabled and interprets the command received on a command bus 513. By means of the use of symbol tags the buses can be set in a broadcast mode, while selective communication is still obtained.

Figure 6:
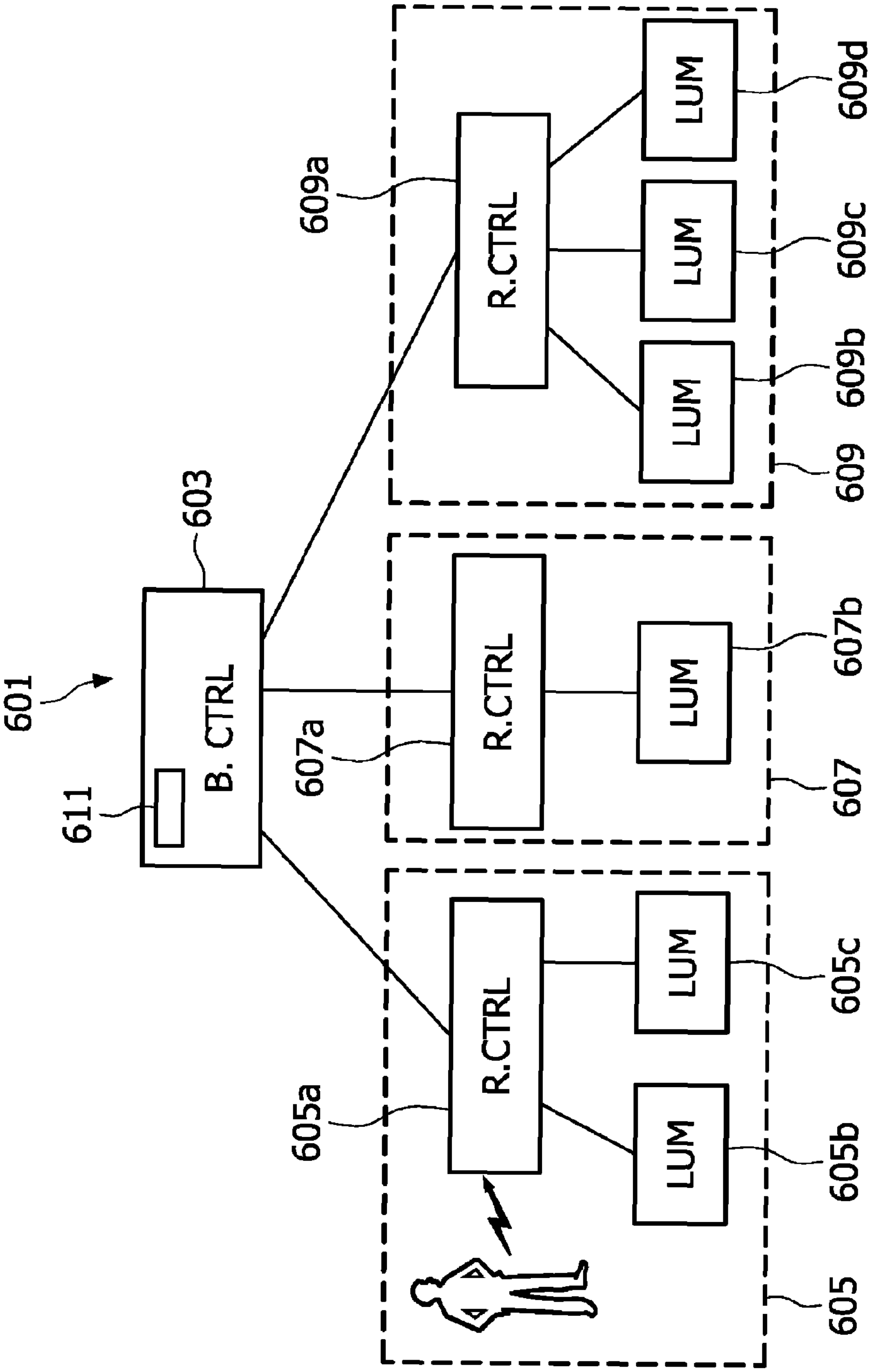
FIG. 6 is a block diagram of an exemplifying building lighting system.

Referring to FIG. 6, assume, as an application example, that one building/room controller 302 or 402, as described above, is used as a building controller 603 for controlling a lighting system 601 of a whole building having several rooms 605, 607, 609. Then, in each room a sub lighting system consisting of a room controller 605*a*, 607*a*, 609*a*, which is connected to the building controller 603, and at least one luminaire 605*b,c*; 607*b*; 609*b,c,d*, connected to the room controller 605*a*, 607*a*, 609*a* respectively, as explained above. The building controller 603 is used for input of data that is common to the whole system, which data, when appropriate, is distributed to the room controllers 605*a*, 607*a*, 609*a*. Optionally, individual room data is also input via the building controller 603 and then distributed to the relevant room controller 605*a*, 607*a*, or 609*a*.

Further, assume that the embodiment employing symbol tags is used, and that personal settings have been programmed into the system. Additionally, in this example, the wireless, preferably radio, input of the room controllers 605*a*, 607*a*, 609*a* is utilized. When a person, having personal data stored in the lighting system 601, enters a room 605, his/her identification (ID), held in a wireless communication unit, is wirelessly sent to the wireless input of the room controller 605*a*. The ID signal installs or activates the personal symbol tag of the person in the symbol tag interpreters of the room lighting system 601. The building controller 603 then broadcasts the personal light setting with the person's symbol tag attached. Only the room 605 where the person presently is matches the symbol tag. The luminaire controllers of the luminaries 605*a*, 605*b*, etc. causes the light sources to emit light in accordance with the personal light setting. When the person leaves the room 605 his/her personal symbol tag is removed from the symbol tag interpreters of the room lighting system of that particular room. As a result, the personally preferred light settings follows the person throughout the building, without the need for a central controller, such as the building controller 603, to know where that person actually is. Consequently, the ID and the corresponding symbol tag installation and removal are local, room-bound, interactions.

The preferred light setting of a person can be related to the person's mood, e.g. romantic, age, e.g. brighter light to compensate for diminishing eyesight, activity, e.g. when the person plays a game on a console the lighting are directly associated with the events and environments occurring in the game, etc.

Figure 7:
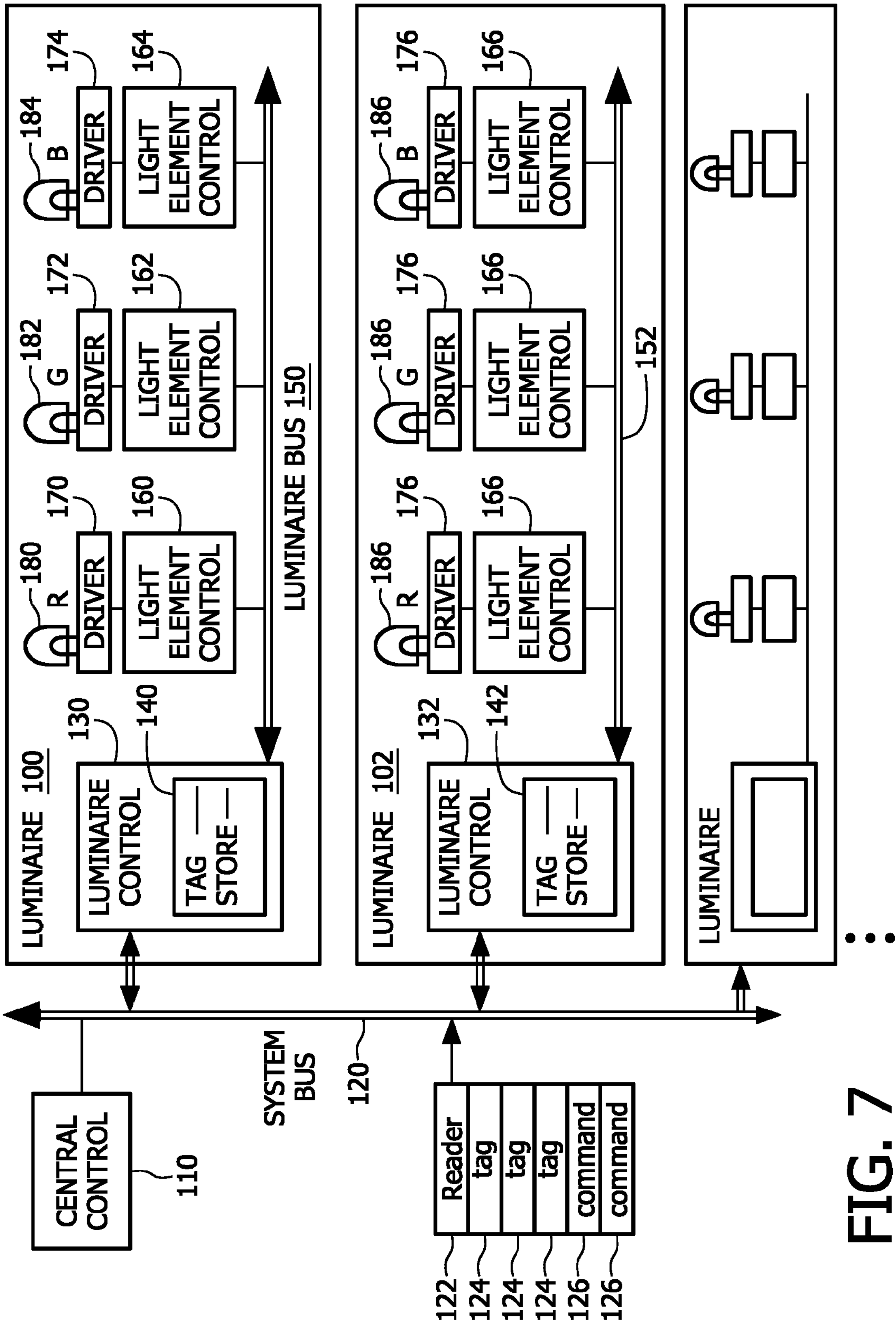
FIG. 7 is a block diagram of a luminaire system.

Referring to FIG. 7, a lighting network and a controller in a luminaire system employ tags to specify those luminaires 100, 102 that are to respond to control messages. A central controller 110, for example a controller for luminaires 100, 102 in a room, sends messages 122 that are tagged with one or more symbol tags 124. Each symbol tag 124 acts as a qualifier of message 122, such that each luminaire controller 130, 132 connected to network 120, recognizes symbol tags 124 that match symbol tags stored in memory 140, 142 of luminaire controllers 130, 132. Symbol tag values may correspond to a location and/or lighting capabilities of a particular luminaire, and particular messages 122 might be directed to all luminaires in a room that meet those tags. For example, tag values might be assigned to specify the north side and south sides of a room, and whether the luminaire can emit light of a variable white color temperatures, and a message might be issued to increase the color temperature on the north side of the room. Those luminaires that match the specified tags respond appropriately.

A luminaire may be arranged with luminaire controller 130, 132 connected via a luminaire bus 150, 152 to several light element controllers 160, 162, 164, 166. Light element controllers 160, 162, 164, 166 may control the output of light sources 180, 182, 184, 186 to emit light of a desired character, for example color and intensity. Light elements 180, 182, 184, 186 may be of different colors, for example red (R), green (G) and blue (B). Each light element controller 160, 162, 164, 166 may be connected to a driver 170, 172, 174, 176 for a corresponding light element 180, 182, 184, 186 or set of light elements. Generally the light elements connected to a single driver 170, 172, 174, 176 and light element controller 160, 162, 164, 166 may be of the same color. The commands issued by a higher-level controller to a lower-level controller, for example from central controller 110 to luminaire controller 130, or from luminaire controller 130 to light element controllers 160, 162, 164, may be very high-level descriptions of "experiences" that a user of the luminaire wishes to experience as a result of the output from the light sources, such as soft evening light, night darkness, bright working light, "cold water," "romantic," "party," etc. The lower-level controller may translate that high-level descriptive command into level commands that drive lighting elements 180, 182, 184.

Central control 110 may be a microprocessor with input and output capabilities that permit a user to define appropriate tags and commands for use in a room or building, and that permits tags to be assigned to specific luminaires 100, 102.

Lighting network 120 may be any conventional or application-specific bus structure, for example RS-232, RS-422, RS-485, X10, DALI, or the MCS100 bus structure described in EP 0 482 680, "Programmable illumination system," or DMX-512 (see United States Institute for Theater Technology, Inc. DMX512/1990 Digital Data Transmission Standard for Dimmers and Controllers). Physical layer implementations typically used for local area networks or similar tens-to-hundreds-of-meters communications may generally be preferable. The EP '680 patent and the specifications for the various known protocols mentioned here are incorporated herein by reference.

Messages 122 on system bus 120 may be transmitted in broadcast mode, so that messages from central controller 110 are available to all luminaire controllers 130, 132 simultaneously.

The format for messages 122 may be any form that achieves the desired end result. In some cases, messages 122 may be packaged in DMX-512 packets. In other cases, an application-specific packet form may be defined with a packet header, a set of tags 124, and one or more command values 126.

Tag values 124 may be provided by manufacturers of lighting system components, for example where the tag relates to the capabilities of a particular luminaire, or may be defined by an individual user, for example where the tag relates to the installation location of the luminaire.

In accordance with an embodiment of the light source, as defined in the claims, each light element controller is able to redefine an associated symbol tag if an internal state of the light element changes.

Tagged message formats may permit easy scalability of the lighting network, because tagged message formats may permit control functions to be distributed throughout the components, and may permit system bus 120 to operate in broadcast mode. Scalability may arise because it may be easier to add light elements without having to reprogram any central controller, and so forth. Scalability may be enhanced both on lower and higher network levels, such as a luminaire having several light sources or a light system having several luminaires.

The forms of command values 126 may be either absolute value end point or incremental. For example, "return to present condition A," "return to preset condition B," "get brighter," "get darker," "more red," "more blue," "more saturation," "less saturation," "return to default white," etc. Other command values 126 may relate to experiences as discussed above. For instance, the known amBX protocol from Philips is useable for describing the experience. Other command values 126 may relate to a setting of the light sources, such as dimming, flashing, emitting a particular color, etc.

Each luminaire controller 130, 132 intercepts tags 124 of messages 122 on bus 120 and checks to see whether its luminaire 100, 102 is to respond. For example, luminaire controller 130, 132 may have a tag store 140, 142 that stores tags to which luminaire 100, 102 is to respond. If the tags match, then message 122 is accepted and handled.

Figure 8:
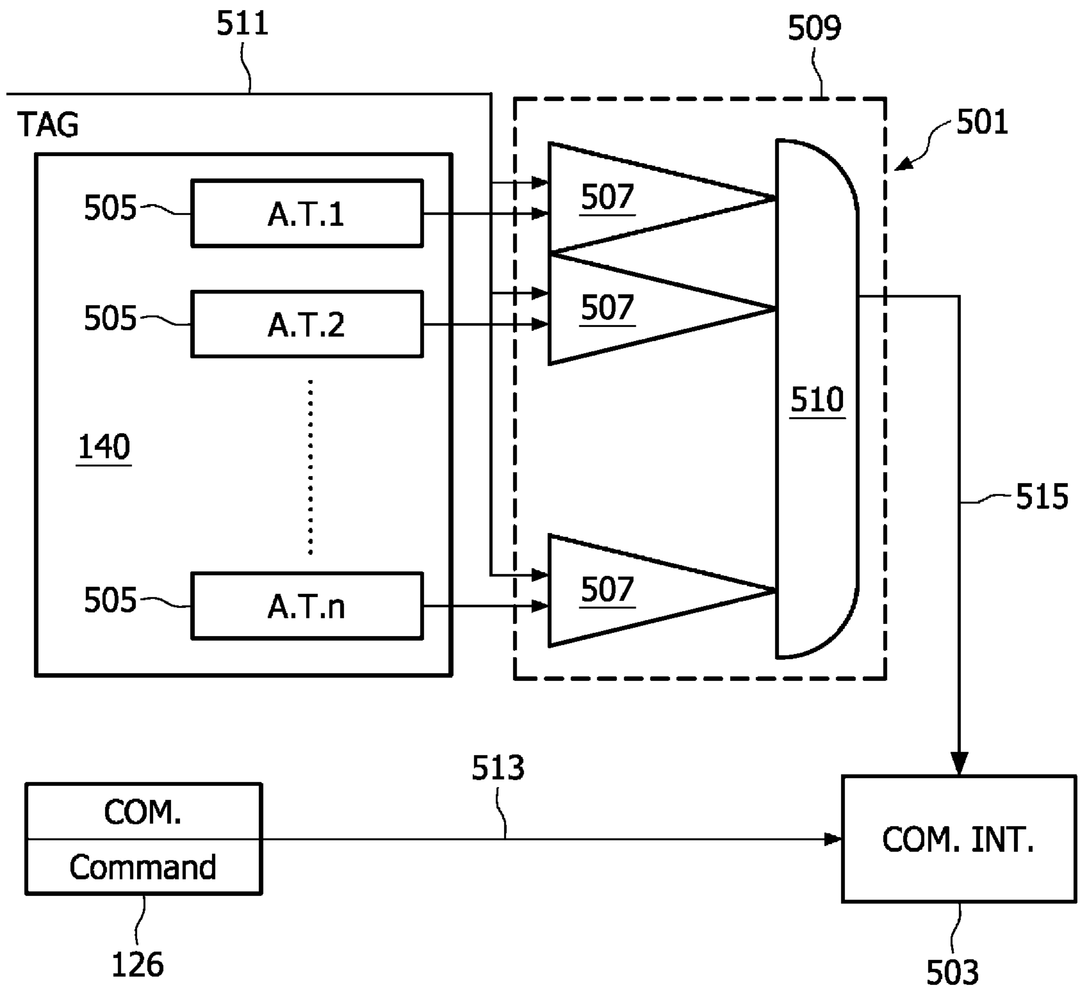
FIG. 8 is a block diagram of a part of a luminaire controller of FIG. 7.

Referring to FIG. 8, the tag detector of luminaire controller 130 may include a plurality of active symbol tags A.T.1, A.T.2, . . . A.T.n stored in tag store 140. Symbol tag 124 of an incoming message 122 may be received by luminaire controller 130 and fed to comparators 507, one for each location in tag store 140, which may be active or inactive. Alternatively, software of luminaire controller 130 may loop sequentially through tag store 120 to compare each tag to received symbol tag 124. Comparators 507 each output a logical one or zero to an OR-gate 510. If any received symbol tag 124 matches any tag in tag store 140, OR-gate 510 outputs a logical one to a message interpreter 503, which is thereby enabled and interprets received command 126 from message 122. Use of symbol tags permits messages 122 and their constituent commands 126 to be selectively received, even though the bus broadcasts all messages.

Referring again to FIG. 7, depending on tag values 124 in a message 122, a message may be acted on by none of the luminaires, all of them, or anything in between. In some cases, a special symbol tag value may specify that all luminaire controllers 130, 132 are to respond, and another special symbol tag value may specify that none of controllers 130, 132 are to respond. The latter may be useful for diagnostic purposes.

In some cases, luminaire controller 130, 132 may be a "dumb" controller whose only function is to identify messages 122 that should be responded to by the controller's luminaire 100, 102, and pass the message on to the light element controllers 10, 162, 164, 166 for them to fully interpret and act upon. In such cases, luminaire controller 130, 132 has little or no responsibility for coordinating the light output of light elements 180, 182, 184, 186, or for determining levels for particular light elements 180, 182, 184, 186; rather, this computation is pushed down to light element controllers 160, 162, 164, 166.

In other cases, luminaire controller 130, 132 may be "smart." For example, luminaire controller 130 may be responsible for interpreting messages 122 and rendering them into absolute light levels for light elements 180, 192, 184.

Luminaire bus 150, 152 may be any bus structure suitable for the purpose. For example, the multiplexed data lines shown in FIG. 7 of U.S. Pat. No. 5,420,482, Phares et al., Controlled Lighting System, may be beneficial to reduce the number of conductors that are used to interconnect the various controllers. The inexpensive bus structure of Phares '482 may introduce artifacts, but these may be innocuous in typical lighting applications. Other bus structures may have a different set of tradeoffs, and be equally suitable.

A full lighting system may have many light sources and can be regarded as structured in several levels. For example, the relationship between luminaire controller 130 and its light element controllers 160, 162, 164 may be considered analogous to the relationship between central controller 110 and luminaire controllers 130, 132. Similarly, an entire building may have a controller that instructs controllers for specific rooms. This analogy may permit similar techniques to be used at various levels.

In situations where the multi-level analogy is exploited, messages on luminaire bus 150, 152 may be similar to those on system bus 120, directed only to high-level "concepts" rather than absolute lighting levels. This might be the case where luminaire controllers 130, 132 are "dumb" and the computational responsibilities are delegated to light element controllers 160, 162, 164, 166. In these cases, messages from luminaire controller 130, 132 may be broadcast on luminaire bus 150, 152 simultaneously to all light element controllers 160, 162, 164, 166. In some cases, messages on luminaire bus 150, 152 may be tagged in a manner similar to messages 122, and the individual light element controllers 160, 162, 164, 166 may have tag comparators so that they respond to the messages based on the tags.

In other cases, messages on luminaire bus 150, 152 may carry other types of messages, for example, absolute lighting levels to be output by light elements 180, 182, 184, 186, for example in the manner discussed in U.S. Pat. No. 5,420,482. In some cases, transmitting lighting commands in the form of general commands directed to functionally-specified luminaires may reduce the amount of data transmitted on system bus 120 and luminaire buses 150, 152.

Light element controllers 160, 162, 164, 166 may receive messages broadcast by luminaire controller 130, 132. These broadcast messages may be general commands, typically implying a change, or explicitly designating color settings, for light elements 180, 182, 184, 186. Each light element controller 160, 162, 164, 166 may then calculate specific drive signal data for its corresponding light element 180, 182, 184, 186. Thus, on basis of general commands that light element controllers 160, 162, 164, 166 receive over luminaire bus 150, 152, each light element controller 160, 162, 164, 166 may then determine drive signals for the specific light element to which it is connected, and applies the drive signals to its corresponding light element driver 170, 172, 174, 176. Light element driver 170, 172, 174, 176 then supplies current to respective light element 180, 182, 184, 186 accordingly.

Each light element controller 160, 162, 164, 166 may have a storage in which calibration data, such as peak wavelength, flux and temperature behavior, for corresponding light element 180, 182, 184, 186 are stored. The calibration data may be stored in storage 214 based on LED binning and LED-make data, or may be set by a user, for example, as the LED's age and lose brightness. The drive signals calculated by light element controllers 160, 162, 164, 166 may be adjusted based on these calibration data.

In some cases, luminaire 100 may have sensors that detect light levels, or may receive light level data from sensors in the room. The data from such sensors may be used in the computation of drive signals as feedback to ensure that the desired output is actually obtained.

By decentralizing computing responsibilities, luminaire controller 130, 132 may be relieved of the need to calculate individual drive signals for each light element. Further, each individual light element controller 160, 162, 164, 166 may only be required to calculate values for a single light element or driver to which it is directly connected, reducing performance demands on the light element controllers. Consequently, luminaire controller 130, 132 and light element controllers 160, 162, 164, 166 may operate at a lower frequency, and lower voltage. Further, individual controllers can be switched off, for example, whenever one or more colors are not being used. Finally, sending messages in broadcast mode to all controllers with tag qualifiers, rather than with having to send individual messages to each controller with explicit addresses, may reduce the number of messages transmitted, reduce bus speeds and drive requirements, and reduce the overhead involved with addressing, which in turn may reduce the required clock frequencies for the controllers. Although the number of controllers may be increased, the reduction in clock frequencies, voltage and power-on time may allow total power consumption to be reduced.

In some cases, messages may be sent in a mode that uses addressing of particular controllers, instead of broadcast mode. In such cases, the messages may be "experience" or other non-level commands, as discussed above.

Drivers 170, 172, 174, 176 may supply and regulate current to light elements 180, 182, 184, 186 using any convenient method, including digital-to-analog converters with voltage and/or current output varying with the input drive signals from light element controllers 160, 162, 164, 166, pulse width modulation (PWM), bit angle modulation, frequency modulated power regulation, etc.

Light elements 180, 182, 184, 186 may be any type of light element, for example, LED's, incandescent lamps, fluorescent lamps, halogen lamps, etc. In some cases, multiple elements may be driven by a single driver—for example, because blue LED's are currently less efficient than green, and green less efficient than red, luminaire 100 may include two red LED's, four green LED's, and six blue LED's in order to achieve a pleasing white balance.

Programming of the system may be effected through a user interface to central controller 110. A user of the luminaire system may select experiences as desired from a list of available experiences. Alternatively, or in addition the room controller may be programmable in that the user may be able to define personal experiences. Upon receiving input from the central controller 110, software in luminaire controller 130, 132 may translate the experience command into a lower-level effect or lighting data, and send the original experience command, the effect, or lighting data, to light element controllers 160, 162, 164, 166. Some effects may be realized as color settings, or several different color settings over time. For example, an experience may require a repetitive shifting between different colors, which goes on until another experience is commanded by central controller 110. Many modifications and alternative embodiments are possible within the scope of the invention.

Summarizing, a controller for a lighting system is disclosed which comprises a command receiving circuitry designed to receive lighting command messages, a format of the messages including a tag value and an instruction value, the tag value specifying a physical attribute of the lighting device to which the message is directed, the instruction value specifying an action to be taken by the lighting device to which the message is directed, the command receiving circuitry having tag comparison circuitry designed to detect messages whose tag value corresponds to the lighting device. The lighting device controlling circuitry being designed to accept the instruction value of a message with a detected corresponding tag value and in response, to output an instruction value for controlling lighting elements of the lighting device.

This controller may further comprise a command receiving circuitry designed to receive lighting command messages, a format of the messages including an instruction value specifying a human emotional experience to be induced by the lighting device to which the message is directed. The lighting device controlling circuitry being designed to accept the instruction value of a message with a detected corresponding tag value and in response, to translate the emotional experience into specific level values for controlling lighting elements of the lighting device.

Further, the controller may comprise a light element data storage containing stored calibration data for the light element; a storage circuitry designed to store calibration data relating to the lighting elements, the light element controlling circuitry being further designed to generate the lighting element drive signals based on the calibration data.

Now, some further general description of the symbol tags will follow. The symbol tags are communicated as a result of a particular event. The symbol tags are most useful for making serial, or successive, changes such as fading from one light setting to another, with minimal calculation power requirements on all units except for the individual controllers of the light elements. Some further examples of symbol tags which can be used are symbol tags representing or causing: white correlated Color Temperature; maximum lumen output; gradual tuning of color; dimming; age of luminaire; fast or slow dynamic lighting capability; luminaire position in the room; and type of light source. There is a range of possible ways to activate and deactivate the symbol tags, from manually operated physical switches, e.g. dip switches, to software operated functions.

Above, embodiments of the light source, and the luminaire and luminaire system that employ the light source, according to the present invention as defined in the appended claims, have been described. These should be seen as merely non-limiting examples. As understood by a skilled person, many modifications and alternative embodiments are possible within the scope of the invention.

For example, it should be understood that each light source can be provided with feed back control, as known to the person skilled in the art, for the light elements in order to ensure that the desired output is actually obtained. However, since this is no core part of the invention no such feed back control will be described more closely.

Thus, as explained by means of the embodiments above, it is advantageous to decentralise the controller of the light source in order to make the final calculations for setting light element drive signals as close to the individual light element as possible. It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A solid state luminaire control system, comprising:

a plurality of light sources in a luminaire;

wherein each of said light sources has:

a plurality of solid state light elements, a plurality of light element controllers, each connected to a respective one of said light elements, and arranged to obtain light element data; and a bus interface, which is connected to said light element controllers via a light source bus, wherein said bus interface is arranged to provide each of said light element controllers with a general command, wherein said light element controllers are arranged to generate light element drive signals on basis of said general command and said light element data;

a luminaire controller connected to said bus interfaces of said light sources via a luminaire bus and receiving said general command with at least one associated symbol tag by a system bus, wherein the luminaire controller communicates to said bus interfaces said general command with said at least one associated symbol tag;

said luminaire controller further including a symbol tag interpreter which includes a one associated symbol tag comparator operable to compare said at least symbol tag with a plurality of active symbol tags for said plurality of light elements.

2. The solid state luminaire system according to claim 1, wherein said light element controllers are individually switchable between on and off states.

3. The solid state luminaire system according to claim 1, wherein said general command include overall light settings.

4. The solid state luminaire system according to claim 1, wherein each one of said light element controllers includes a light element data storage containing said light element data.

5. The solid state luminaire system according to claim 1, wherein said light element controllers each include a symbol tag interpreter and is tagged with at least one symbol tag, wherein said general command each include at least one symbol tag, and wherein there are several different types of symbol tags.

6. The solid state luminaire system according to claim 5, wherein said symbol tag interpreter for each of said light element controllers comprises a symbol tag comparator, which is arranged to compare a symbol tag received in said general command with said at least one symbol tag that the light source controller is tagged with, and wherein said symbol tag interpreter is arranged to accept the general command if said symbol tag comparator finds a symbol tag match.

7. The solid state luminaire system according to claim 5, wherein said light element controllers each comprise a state monitor, which is able to redefine said at least one symbol tag if an internal state of the light element changes.

8. The solid state luminaire system according to claim 1, wherein said luminaire controller comprises an effect translator for receiving input data regarding a desired experience, which is to be generated by means of said light sources, and for translating the experience into at least one effect embodied as at least one general command.

9. The solid state luminaire system according to claim 1 further including a system controller which is connected with a plurality of luminaires via a system bus, and which is arranged to generate output data regarding experiences.

10. The solid state luminaire system according to claim 9, wherein said system bus is set in addressing mode, wherein said output data is individual experience commands, and wherein said system controller is arranged to send the individual experience commands to individual luminaires.

11. The solid state luminaire system according to claim 9, wherein said system bus is set in broadcast mode, and wherein said output data is common to said plurality of luminaires.

12. The solid state luminaire system according to claim 9, wherein said system controller comprises a symbol tag generator, which is arranged to generate and tag said output data with at least one symbol tag.

13. A luminaire system, comprising:

a plurality of luminaires, each of said luminaires having a luminaire controller in digital communication with a luminaire system bus;

wherein said luminaire controller includes a tag store for securing a plurality of tags, each of said tags representative a physical attribute of a lighting device;

said luminaire controller being in digital communication with a luminaire bus within said luminaire;

said luminaire bus of said luminaire being in digital communication with a plurality of light element controllers, each light element controllers operable to read lighting commands from said luminaire controller and provide digital driving signal instructions to a solid state light source driver;

wherein said luminaire controller of said luminaire receiving lighting commands from said system bus, said lighting commands including at least one tag and at least one command;

said luminaire controller including instructions for a tag interpreter to compare said plurality of tags in said tag store with said lighting command tag and relay said lighting command to said luminaire bus;

wherein each of said tag stores in each of said luminaire controller for each of said plurality of luminaires is operable to include non-unique tags.

14. A method of controlling a distributed network of a plurality of solid state luminaries in a solid state luminaire control system, comprising:

broadcasting a general command to said plurality of solid state luminaries in said distributed network, each of said plurality of solid state luminaires having a plurality of light sources;

connecting each of said plurality of light sources for each of said luminaires together on a luminaire bus;

communicating commands to each of said plurality of light sources from a luminaire controller;

reading said communicated commands from said luminaire controller at each of said plurality of light sources with a light source controller, said light source controller for each of said plurality of light sources controller a driver to drive a lighting element;

said broadcast general command read by said luminaire controller including at least one tag symbol;

comparing said at least one tag symbol of said general command with a plurality of active symbol tags assigned to said luminaire controller;

transmitting said broadcast general command and said at least one tag symbol to said luminaire bus when said luminaire controller matches said at least one tag symbol of said general command with at least one of said plurality of active symbol tags assigned to said luminaire controller;

reading said transmitted broadcast general command by each of said plurality of light sources electrically connected to said luminaire bus;

interpreting said transmitted general command by each of said plurality of light source controllers in said luminaire by a tag interpreter to selectively drive said lighting element.

* * * * *